Aug. 24, 1965

J. F. HALL, JR 3,202,811

LABORATORY SUN SIMULATOR

Filed June 23, 1961

INVENTOR.
JOSEPH F. HALL, JR.

BY Frank C. Parker
Arthur L. Nelson
ATTORNEYS

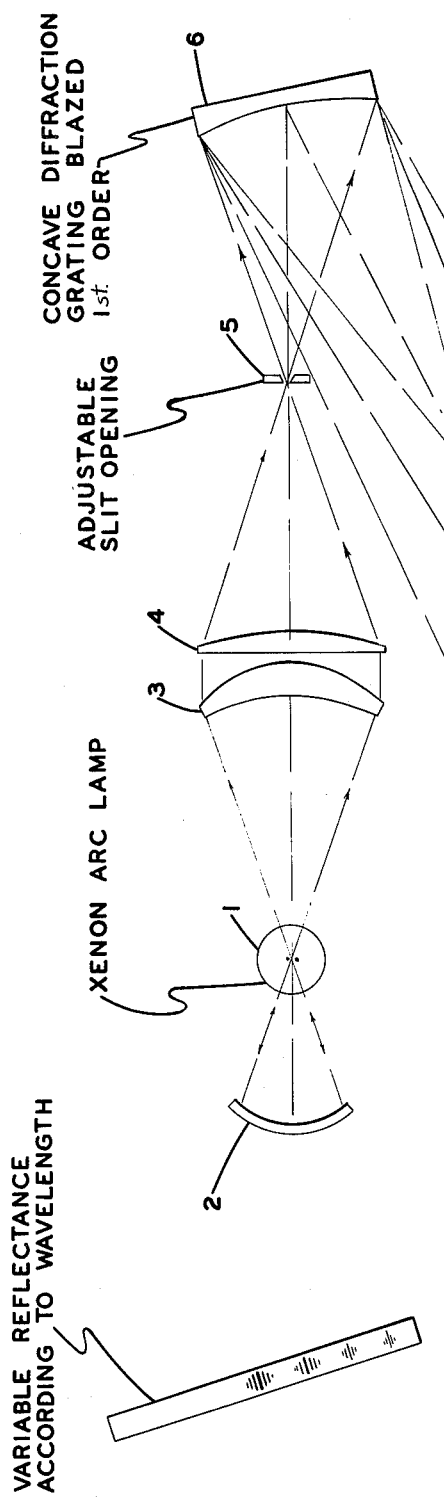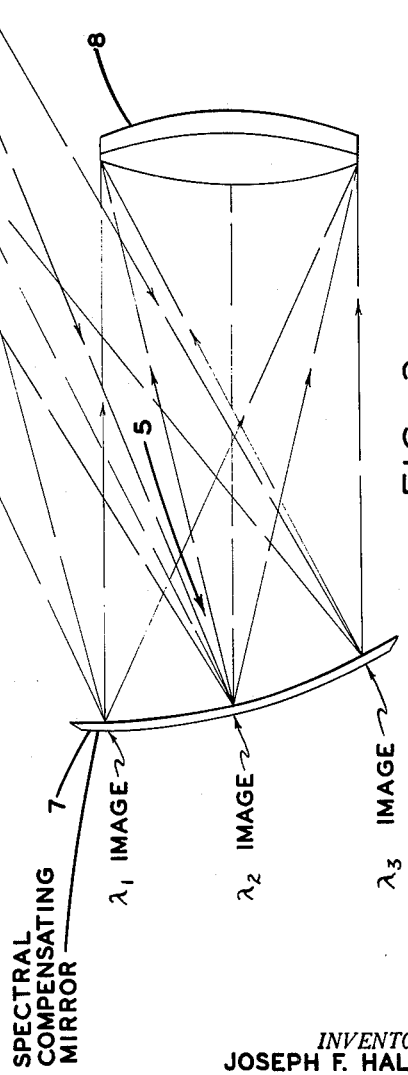

3,202,811
LABORATORY SUN SIMULATOR
Joseph F. Hall, Jr., Rochester, N.Y., assignor to Bausch & Lomb Incorporated, Rochester, N.Y., a corporation of New York
Filed June 23, 1961, Ser. No. 119,204
8 Claims. (Cl. 240—1.1)

This invention relates to a means for simulating the solar spectrum and more particularly to a means for modifying the spectrum of a source of light to simulate the solar spectrum.

A sun simulating system must provide a luminous flux having spectral distribution of which conforms to the solar spectrum in providing an accurate illuminated test area. An artificial source of light may provide adequate illumination but its failure to provide the spectral distribution present in the solar spectrum fails to provide a true simulation of the sun. Accordingly the laboratory sun simulator subsequently described is intended to overcome the inaccuracies in the spectral distribution of an artificial source of light used for test purposes.

It is an object of this invention to provide a laboratory sun simulator.

It is another object of this invention to provide a means for modifying the spectrum of an artificial source of light to simulate the solar spectrum.

It is a further object of this invention to control the reflectance of a dispersed light to produce a simulated solar spectrum on a test area.

The objects of this invention are accomplished by providing a xenon arc lamp as a source of light. A spherical reflector is employed to intensify the light which is directed through a lens system. The lens system focuses the luminous flux on a slit which defines the beam and controls the intensity. The luminous flux transmitted through the slit impinges upon a concave diffraction grating. The concave diffraction grating diffracts the light and also focuses the image of the slit on a compensating mirror. The various wavelengths reflected by the mirror are distributed according to wavelength along the surface of the mirror. The reflectance of the mirror compensates for the variations of the spectral distribution of the artificial source of light in comparison with the solar spectrum. In this manner only the spectral distribution of the solar spectrum is reflected to the test area. The simulator provides an accurate simulation of the sun's radiation on a test area which is available in a laboratory.

The following illustrations and description sets forth the preferred embodiment of this invention. Any modification of the preferred embodiment within the principles set forth as illustrated and described in the following paragraphs are considered to be within the scope of the invention.

FIG. 3 is a schematic diagram illustrating the operation of the sun simulator.

FIG. 4 illustrates the test area wherein the reflected luminous flux from the mirror is collimated to provide a test area.

FIG. 5 illustrates the compensating mirror as viewed in the direction of arrow 5.

Figure 1:
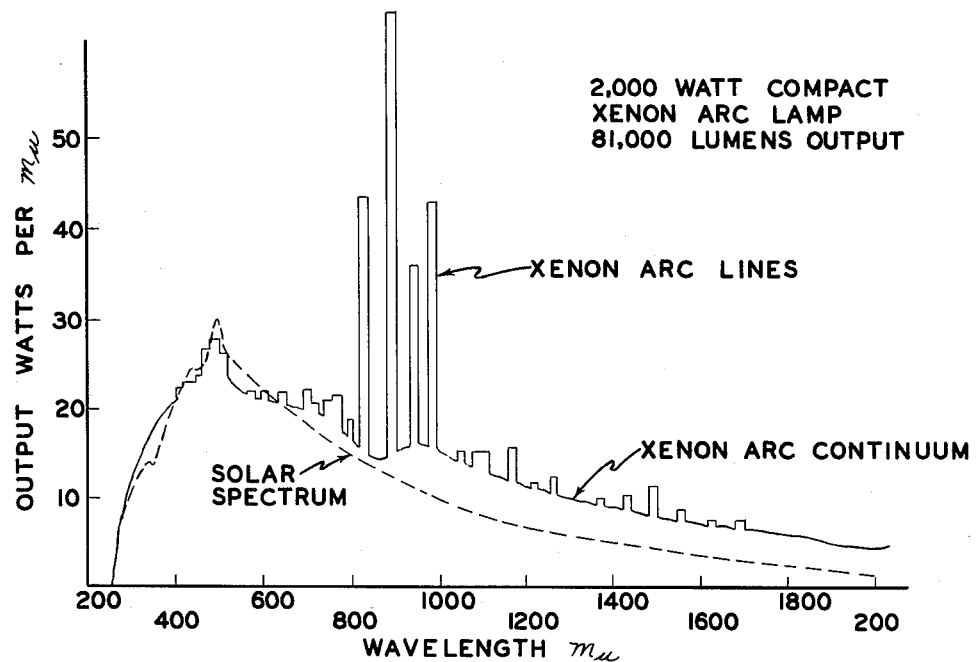
FIG. 1 illustrates the spectral distribution of the sun as compared to a xenon arc light.

The principle involved in this invention is the use of a source of light having a spectral distribution similar to that of the solar spectrum. Referring to FIG. 1 the solar spectrum is indicated by the dotted line. It can be seen that the xenon arc lamp spectrum is roughly similar to that of the solar spectrum but of slightly greater intensity for most wavelengths with the exception of the xenon arc lines. The high pressure xenon gas radiates a continuum substantially similar to that of the solar spectrum. The reflectance of the mirror on the various portions controls the spectral distribution of the reflected light. In this manner, the xenon arc radiation may be modified to provide a spectral distribution similar to the solar spectrum.

A high pressure xenon arc lamp is employed as a light source which radiates a spectral distribution as indicated by the xenon arc continuum substantially equal to the solar spectrum. The xenon arc lines are also present in the xenon spectrum. The xenon arc lines in the 800 m$\mu$ to 1000 m$\mu$ area are particularly noticeable. These lines are corrected through the reflection of the mirror and will be more specifically described later in this description.

Referring to FIG. 3, the schematic diagram of the laboratory sun simulator is illustrated. The source of radiation 1 is the high pressure xenon arc lamp. The xenon lamp produces an extremely intense and very stable arc. The xenon arc lamp is positioned at the radial center of the spherical reflector 2.

The spherical reflector 2 reflects the image of the xenon arc lamp and virtually intensifies the source of light by redirecting the light through the quartz lenses 3 and 4. The source of radiation is imaged on the slit 5 by the quartz lenses 3 and 4. The slit 5 is adjustable and will provide a variable opening for the light impinged upon the slit. The variation of the opening of the slit controls the resolution of the system as well as the intensity of the light transmitted through the system. The luminous flux passing through the slit impinges upon the concave diffraction grating 6. The concave diffraction grating 6 is blazed in the first order with 7,000 lines per inch at 0.5 m$\mu$. The inventor does not wish to limit the diffraction grating to the specific grating employed in this system but has used this type of a grating to transmit the first order in greatest intensity as this permits a filtering means to more readily control the spectral distribution of the higher orders.

The diffraction grating 6 disperses the luminous flux passing through the slit 5. The diffraction grating being a concave grating also focuses the dispersed light on the compensating mirror 7. The slit images of the various wavelengths are imaged and spaced in relation to the wavelengths on the compensating mirror. The compensating mirror has variable reflectance to modify the reflectance of the various wavelengths to produce a close simulation of the solar spectrum on the output of the system. The compensating mirror modifies the intensity of illumination of each of the wavelengths and then recombines the various wavelengths for the corrected luminous flux at the test area. Modification of the intensity of the light may be controlled by partial absorption and partial reflection. Another method of controlling the light intensity is by permitting partial passage of the light through the mirror and partial reflectance by the use of a partially transparent mirror. The latter method reduces heating of the mirror. The various wavelengths are recombined by the compensating mirror 7 and directed through the output lens 8 which collimates the various wavelengths and projects them onto a test area indicated in FIG. 4. FIG. 4 is merely an indication of the test area in a view taken at right angles to the output lens 8.

FIG. 5 is viewed in the direction of arrow 5 in FIG. 3. The compensating mirror 7 has a spherical formation, but only a strip is used which receives the images from the concave diffraction grating as dispersed by the diffraction grating.

Figure 2:
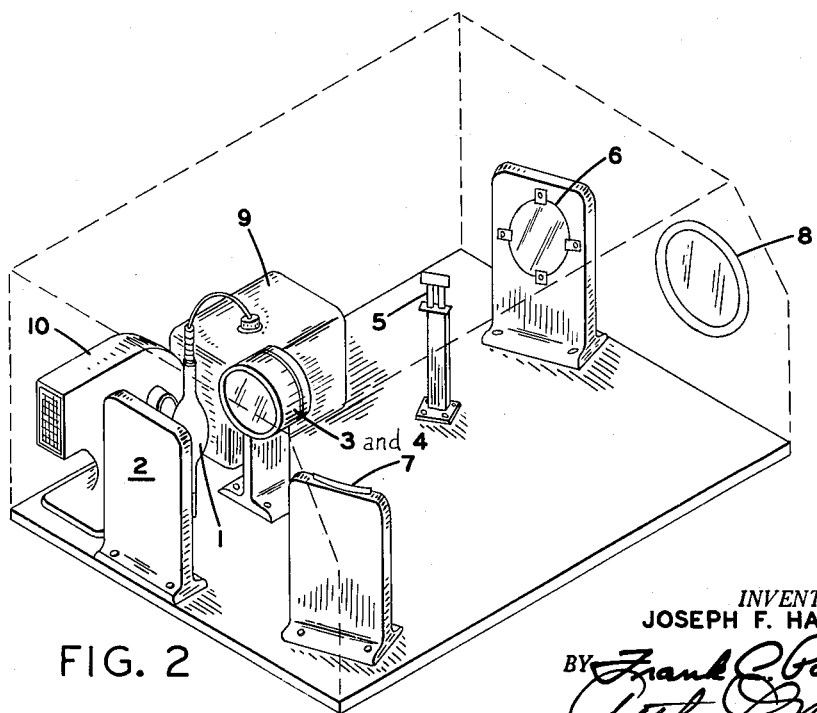
FIG. 2 illustrates the relative location of the major optical components within the sun simulator.

FIG. 2 illustrates the relative location of the major optical components in the system. The xenon arc lamp is connected to a power supply 9. The reflector 2 redirects the rays through the lenses 3 and 4 which are mounted immediately in front of the xenon arc lamp 1. The slit 5 controls the width of the image formed on the concave diffraction grating 6. The compensating mirror 7 receives the image from the concave diffraction grating 6 and redirects the corrected luminous flux to the output lens 8 which collimates the corrected spectrum on the test area. A blower 10 is mounted within the simulator system to provide a cooling of the various elements within the system and particularly the compensating lens 7 which absorbs a certain quantity of the energy impinged upon it from the source of radiation.

The optical system provides a diffraction grating monochromator of a large illuminated area. The monochromator differs from the conventional system by modifying the intensity of the illumination of each wavelength and then recombining the corrected radiation at the test area. The corrected radiation at the test area will have the spectral characteristics of the solar radiation. The reflctance, $R_{\text{mirror}}(\lambda)$, at each point on the spectral compensating mirror, provides a predetermined reflectance for each wavelength $(\lambda)$ of the relationship of the intensities of the spectrums:

$$\frac{I_{\text{solar}}(\lambda)}{I_{\text{xenon}}(\lambda)}$$

to provide the proper reflectance. Consequently, radiation reflected and recombined at the test area will have the spectral characteristics of solar radiation, $I_{\text{solar}}(\lambda)$. This relationship can be expressed by:

$$I_{\text{solar}}(\lambda) = [R_{\text{mirror}}(\lambda)][I_{\text{xenon}}(\lambda)]$$

giving for the reflectance of the compensating mirror:

$$R_{\text{mirror}}(\lambda) = \frac{I_{\text{solar}}(\lambda)}{I_{\text{xenon}}(\lambda)}$$

There is a special relationship between the wavelength and the location of the image of the slit for that wavelength. The grating employed in this system is blazed in the first order, $m=1$; and the overlapping orders will be accounted for through a filtering medium. The concave diffraction grating images the various wavelengths on the compensating mirror 7. The image of the slit at the various wavelengths falls on the compensating mirror with displacements proportional to the wavelength. The reflectance of the mirror at the various displacement points corresponding to the wavelength provides a reflectance to modify the wavelength from the arc lamp to equal the intensity of this wavelength in the solar spectrum. In this manner the intensity of each precise wavelength is corrected. Each wavelength transmitted from the xenon arc lamp is modified by the compensating mirror to equal the intensity of this particular wavelength in the solar spectrum and in this manner a precise match of the solar spectrum can be achieved.

The resolution of the system is limited by the slit size. The slit size is adjustable and therefore for resolution may be controlled to a certain degree by the slit opening. The image of the xenon arc at the slit will be approximately .07 of an inch in width. The magnification of the slit through the concave diffraction grating and imaged on the compensating mirror will be approximately .21 of an inch. This is true because the magnification of the concave grating is approximately 3. The images on the compensating mirror will be spaced in relation to the degree of dispersion of each particular wavelength and a certain degree of overlapping will be present. Analysis of the arc indicates that approximately ⅔ of the energy will go through the slit opening of .04 of an inch which would correspond to .12 of an inch on the compensating mirror. The overlapping of slit images will be reduced and the resolution will be improved for this opening.

The spectral emission of the xenon lamp may be brought into close agreement by the compensating mirror with that of the solar spectrum over nearly every 10 m$\mu$ band. The greatest discrepancy would occur for the four xenon arc lines between 800 m$\mu$ and 1000 m$\mu$. The peak output of these bands is several times higher than the continuum, but due to their narrowness, they contain relatively little total energy. The gradual rise in output beyond the 1000 m$\mu$ band width is principally due to the infrared emission of the hot anode. This increase in emission causing a rise in the continuum of the xenon arc is compensated for on the compensating mirror and then recombined at the test area.

The invention has been illustrated and described in the preceding paragraphs. The following claims define the scope of this invention.

I claim:

1. A sun simulating device comprising in combination, a source of light radiating a luminous flux, a slit means, lens means focusing the luminous flux to form an image of said source on said slit means, a luminous flux dispersing means dispersing the different wavelengths in the luminous flux and focusing the images of said slit means formed by the different wavelengths, a spectral compensating mirror receiving the images and modifying the intensity of illumination of the different wavelengths in the luminous flux and recombining a corrected luminous flux to simulate spectral characteristics of solar radiation.

2. A laboratory sun simulator comprising in combination, a source of light radiating a luminous flux, a spherical reflector located with the arcuate reflecting surface of said reflector in an arc equal distant from the location of said source of light, a slit means, lens means focusing the luminous flux to form an image of said source of light on said slit means, luminous flux dispersing means dispersing and imaging the images of said slit means formed by the various wavelengths of the luminous flux, a spectral compensating mirror receiving said images and modifying the intensity of the light of various wavelengths in the luminous flux, said spectral compensating mirror recombining a corrected luminous flux thereby providing the spectral characteristics of the solar radiation.

3. A laboratory sun simulating device comprising in combination, a spherical reflector forming a spherical segment for a reflecting surface, a xenon arc lamp positioned in the radial center of said spherical reflector and radiating a luminous flux, an adjustable slit means, lens means imaging said xenon lamp on said slit means, a luminous flux dispersing means dispersing the light of various wavelengths in the luminous flux and imaging said slit means, a spectral compensating mirror receiving the images of said slit means transmitted by the various wavelengths in the luminous flux, a variable reflecting surface on said compensating mirror to provide variable reflectance in a predetermined relation of the variation of intensity of illumination of various wavelengths in the solar spectrum to the xenon arc lamp, said spectral compensating mirror recombining a correct luminous flux to provide the spectral characteristics of the solar radiation.

4. A laboratory sun simulating device comprising in combination, a xenon arc lamp radiating a luminous flux, a spherical reflector having its radial center in said xenon arc lamp and reflecting the luminous flux through said xenon arc lamp to provide a virtual intensification of said luminous flux, an adjustable slit means providing a variable opening, a lens means imaging said xenon arc lamp on said slit means, a concave diffraction grating, a concave spectral compensating mirror, said concave diffraction grating imaging a plurality of images of said slit on said compensating mirror spaced in relation to the chromatic characteristic of the light rays in said luminous flux, a variable absorption and reflection characteristic on said spectral compensating mirror receiving the plurality of images of the various wavelengths in the luminous flux, said spectral compensating mirror modifying the intensity of illumination of the various wavelengths in the luminous flux and recombining a corrected luminous flux to provide the spectral characteristics of the solar radiation.

5. A laboratory sun simulator comprising in combination, a xenon arc lamp, a spherical reflector mounted with its radial center in said xenon arc lamp, an adjustable slit means, a lens means imaging said xenon arc lamp on said slit means, a concave diffraction grating blazed in the first order, a concave spectral compensating mirror, said diffraction grating imaging a plurality of images of said slit means on said concave spectral compensating mirror displaced relative to the wavelengths in the luminous flux, a variable reflecting surface on said compensating spectral mirror reflecting the various wavelengths in the luminous flux in direct proportion to the intensity of illumination of the specific wavelength in the solar spectrum relative to the intensity of the specific wavelength in the xenon arc lamp, said spectral compensating mirror recombining a corrected luminous flux to provide an illumination simulating the solar spectrum.

6. A laboratory sun simulator comprising in combination a high pressure xenon lamp radiating a luminous flux, a spherical reflector having an arcuate reflecting surface lying in an arc with the radial center concentric with said lamp, an adjustable slit means, a lens means imaging the xenon lamp on said slit means, said slit means defining the beam to control the intensity of the luminous flux passing through the sun simulator and control the resolution in the sun simulator, a concave diffraction grating blazed in the first order to concentrate the intensity of the luminous flux in the first order of diffraction, a concave spectral compensating mirror, said diffraction grating imaging a plurality of slit means images on said concave spectral compensating mirror displaced in relation to the various wavelengths in the luminous flux, a variable reflecting surface on said spectral compensating mirror reflecting wavelengths impinged upon said reflecting surface in direct proportion to the relationship of the wave intensity of the solar spectrum relative to the xenon lamp spectrum, said concave spectral compensating mirror reflecting a modified luminous flux and recombining the flux to provide an illumination simulating the solar spectrum.

7. A sun simulating device comprising in combination, a source of light radiating a luminous flux, a luminous flux dispersing means receiving the luminous flux from said source of light and dispersing the various wavelengths in the luminous flux and focusing the images formed by the various wavelengths in the luminous flux, a concave spectral compensating mirror receiving the light images formed by the different wavelengths at predetermined points on the mirror surface, the reflectance characteristic of the mirror surface at each of said points constructed of variable reflectance material with the reflectance of each wavelength being equal to the intensity of the wavelength in the solar spectrum divided by the intensity of the source of light spectrum thereby modifying the intensity of the various wavelengths, said mirror recombining a corrected luminous flux to thereby simulate the spectral characteristics of solar radiation.

8. A sun simulating device comprising in combination, a source of light radiating a luminous flux, a luminous flux dispersing means receiving the luminous flux from said source of light and dispersing and focusing the images formed by the various wavelengths in the luminous flux, a concave partially transparent spectral compensating mirror receiving the light images formed by the different wavelengths in the luminous flux at predetermined points on the mirror surface, the characteristic of the mirror at each of said points constructed of a variable transmittance and reflectance material with the light in each wavelength in the luminous flux being either transmitted or reflected and, the reflectance of each wavelength being equal to the intensity of the wavelength in the solar spectrum divided by the intensity of the souce of light spectrum thereby partially transmitting and partially reflecting the various wavelengths in a varying relationship and recombining the corrected luminous flux to simulate the spectral characteristics of solar radiation.

References Cited by the Examiner

UNITED STATES PATENTS

| 2,106,995 | 2/38 | Clary | 240—41.1 |
|---|---|---|---|
| 2,206,521 | 7/40 | Van Den Akker et al. | |
| 2,218,253 | 10/40 | Weaver | 88—22.5 |
| 2,236,379 | 3/41 | Pineo | 88—14 |
| 2,571,937 | 10/51 | Peck | 88—14 |
| 2,729,143 | 1/56 | White | 88—84 X |
| 2,823,577 | 2/58 | Machler | 88—1 |
| 2,938,424 | 5/60 | Herriott | 88—22.5 X |
| 3,013,470 | 12/61 | Pliskin | 88—14 X |
| 3,045,532 | 7/62 | Staunton | 88—14 |

FOREIGN PATENTS 832,378  10/51  Great Britain.

NORTON ANSHER, Primary Examiner.